Patented Sept. 5, 1939

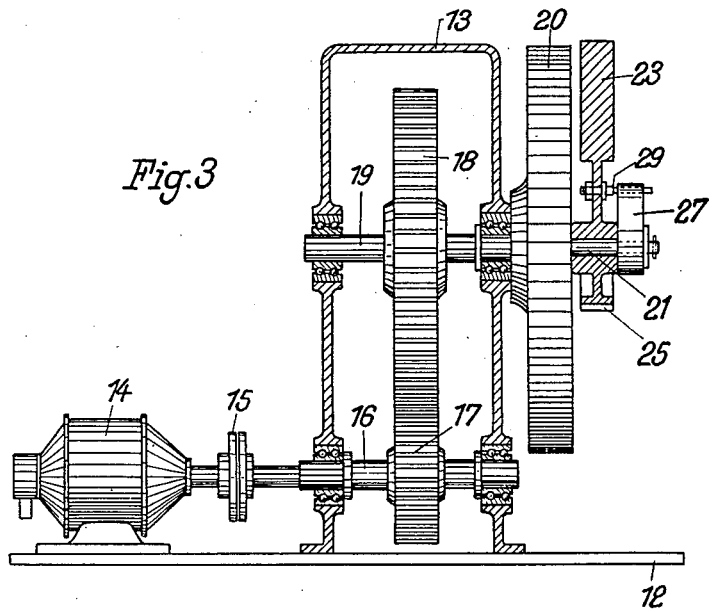
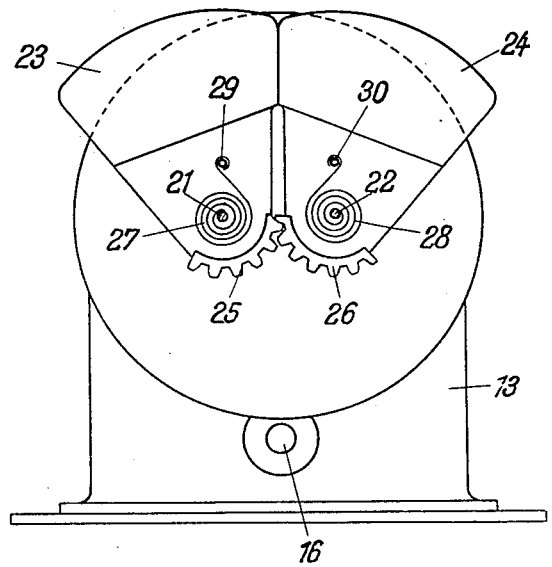

2,171,808

UNITED STATES PATENT OFFICE 2,171,808

VIBRATION GENERATOR FOR TEST PURPOSES

Boris von Schlippe, Dessau, Germany, assignor to Junkers Flugzeug- und Motorenwerke Aktiengesellschaft, Dessau, Germany Application November 16, 1936, Serial No. 111,094
In Germany November 25, 1935

4 Claims. (Cl. 74—61)

My invention relates to means for artificially generating vibrations in order to test technical structures. It has particular reference to vibration generators intended to test static supporting structures and it is an object of my invention to provide devices of the kind aforesaid which are simpler in design and more efficient in action than other devices hitherto suggested for the same purpose.

It has already been proposed to connect static supporting structures with vibration generators comprising eccentrically located rotary masses which artificially generate the vibrations to be impressed upon the structure. The characteristic of the vibrations occurring in the structure can serve for judging the dynamic properties of the structure. These known devices involve the drawback that the forces created by them increase to an extraordinary extent in proportion to the increase in frequency of the impressed vibrations, i. e., with the increase in the number of impulses of the vibration generator. The centrifugal force exerted by an eccentrically arranged rotating mass follows the rule $z = m \cdot r \cdot w^2$, wherein $m$ is the mass, $r$ its distance from the axis of rotation and $w$ the angular velocity. Since in many cases the vibration characteristic of structures must be tested throughout a great range of frequencies, the forces exerted at high faequencies may become so great as to lead to the destruction of the structure.

One has tried to avoid this drawback by changing the distance of the eccentric masses from the axis of rotation. However in such case the vibration generator must be stopped and must moreover be readily accessible. This involves considerable difficulties in many cases, for instance in the testing of structural parts of a flying machine during flight, since in such a case the vibration generator can frequently not be arranged at points of the craft, which are readily accessible during flight, so that in test flights landing becomes necessary whenever a predetermined range of frequencies has been tested, in order to be able to change the adjustment of the vibration generator.

In the vibration generator according to the present invention the magnitude of the forces generated by it is regulated automatically in proportion to the increase in the number of revolutions and/or frequencies. This end is attained thereby that the increasing number of revolutions automatically causes the distance between the resultant centre of the eccentric masses and the axis of rotation to be diminished. In a preferred form of the new device this change of distance is brought about by the centrifugal force itself.

In the drawings affixed to this specification and forming part thereof, the principle underlying this invention and two embodiments of a vibration generator designed according to this principle are illustrated diagrammatically by way of example.

In the drawings:

Fig. 1 is a diagram of forces, while

Figs. 3 and 4 are a side elevation, partly in vertical section, and an end view, respectively, of another modification.

Figure 1:
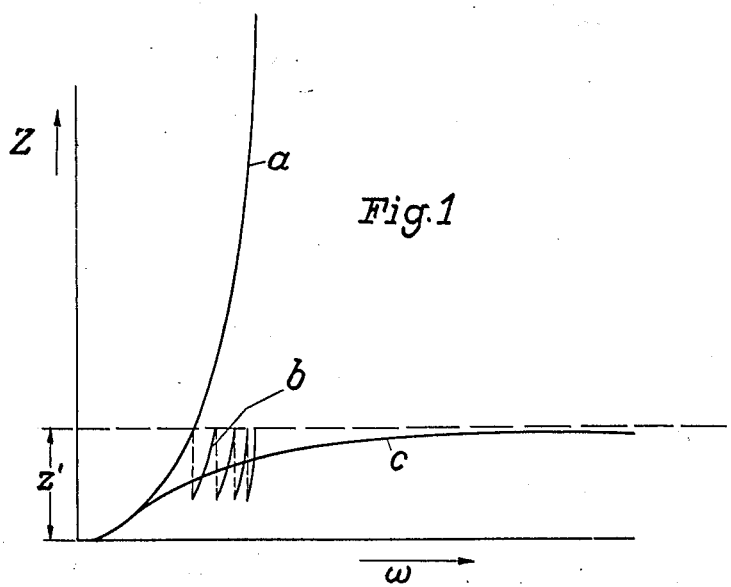

Referring to the drawings and first to Fig. 1, the magnitude of the centrifugal force Z is plotted in dependency from the angular velocity $w$, as it appears in different vibration generators. The parabolic curve $a$ shows the rapid increase of centrifugal force in one of the known vibration generators without the distance between the resultant mass centre and the axis of rotation being varied. Line $b$ represents the magnitude of the centrifugal forces resulting in another vibration generator of known design, in which the distance between the resultant mass centre and the axis of rotation is varied. Whenever the centrifugal force attains the highest admissible value $z'$, the vibration generator must be brought to a stand still to be readjusted.

In contradistinction thereto the curved line $c$ shows the variation of centrifugal force in a vibration generator according to this invention. This curve approaches asymptotically the predetermined admissible maximum value $z'$. It shows that in this case the vibration generator can be used throughout any range of frequencies without requiring any adjustment from the outside.

Figure 2:
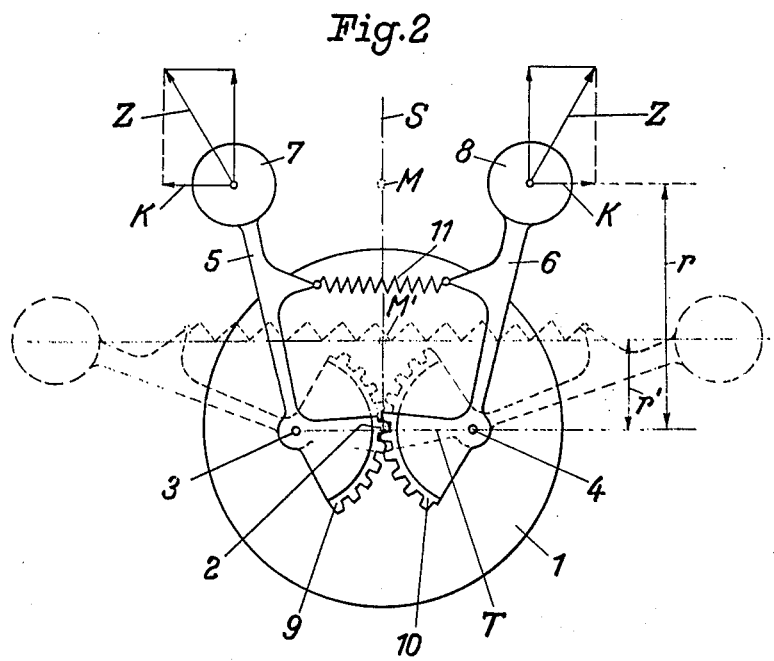
Fig. 2 is a diagrammatic elevation of one form of a vibration generator according to this invention.

Fig. 2 illustrates one form of a vibration generator operating on this principle. Here 1 is a rotating body which revolves about its axis of rotation 2 with an angular velocity variable as desired. On this body 1 are pivoted for rocking motion levers 5 and 6, their pivot points 3 and 4 being arranged at equal distance from the axis 2. At the outer ends of the levers masses 7 and 8 are mounted, while the inner ends are kinetically coupled by toothed segments 9 and 10 in such manner that in rocking they always assume the same angular positions relative to the middle vertical S erected on the line T connecting the two pivot points 3 and 4. A spring 11 extending between the two lever arms 5 and 6 tends to adjust the two masses 7 and 8 to that position, in which the resultant mass centre M is at a great distance r from the axis of rotation 2.

In the operation of this device, if the body 1 is set revolving, the spring 11 is acted upon by the components K, extending vertically to the middle line S, of the centrifugal forces Z generated by the masses 7 and 8. The spring is now expanded until the equilibrium is restored between its tension and the components of the centrifugal forces. While the spring is so expanded, the levers 5 and 6 are rocked outwardly, whereby the resultant mass centre M is moved towards the axis of rotation 2. Thus in this device a predetermined position of the resultant mass centre is correlated to a predetermined angular velocity in this sense, that the distance between the resultant mass centre and the axis of rotation gradually decreases in proportion to the increase of the angular velocity. The position of the masses and lever arms at comparatively high angular velocity is illustrated in dash lines. In this case the resultant mass centre is at M', at a distance r' from the axis of rotation 2.

Figs. 3 and 4 illustrate another modification in which 12 is a foundation plate, on which is mounted the casing 13 supporting the vibration generator proper and the electromotor driving same by means of a coupling 15, shaft 16 and step-down gears 17 and 18. On the spindle 19 carrying the gear wheel 18 is mounted the revoluble body 20, which has the form of a fly-wheel carrying two pins 21, 22 forming pivots for the eccentric masses 23, 24. These masses are formed on their inner arms with toothed segments 25, 26 arranged concentrically to the pivot points 21, 22, and keeping the angular movements of the masses equal. The spring forces compensating the oppositely directed components of the centrifugal force are furnished by two spiral springs 27, 28, the inner ends of which are fixed to one of the pins 21, 22, respectively, while the outer ends are fixed to pins 29 and 30 secured to the masses 23 and 24, respectively.

The forces exerted on the structure to be tested by one of the vibration generators here described act periodically according to the number of revolutions in all directions within the plane of revolution. If it should be intended to cause these forces to act only in two opposite main directions, this can be obtained in a well known manner by arranging in juxtaposition two vibration generators revolving at the same number of revolutions in such manner that the forces generated by them balance each other in all excepting the desired directions.

I wish it to be understood that I do not desire to be limited to the exact details of construction shown and described for obvious modifications will occur to a person skilled in the art.

I claim:

1. A vibration generator for testing technical structures comprising in combination, a rotary body, means for rotating said body at varying speeds, two masses and means mounting them on said body for oscillation eccentrically to, and for rotation about, the center of rotation of said body, all movable masses being adapted to maintain the resultant center of the masses at a substantial, yet variable distance from said center of rotation, and spring means associated with said mounting means adapted to automatically adjust the reduction of said distance, brought about by the centrifugal effect, in proportion to the increase in the number of revolutions of said body.

2. A vibration generator for testing technical structures, comprising in combination, a rotary body, means for rotating said body at varying speeds, two lever arms pivoted eccentrically to said body by their inner ends at points near and equidistant from the center of rotation of said body, and centrifugal masses secured near the outer ends of said arms and spaced farther away from said center of rotation than the inner ends thereof, all movable masses being adapted to maintain the resultant center of the masses at a substantial, yet variable distance from said center of rotation, and elastic means connecting said arms and counteracting the centrifugal effect acting on said masses so as to automatically adjust the reduction of said distance, brought about by the centrifugal effect, in proportion to the increase in the number of revolutions of said body.

3. A vibration generator for testing technical structures comprising in combination, a rotary body, means for rotating said body at varying speeds, two masses and means mounting them on said body for oscillation eccentrically to, and for rotation about, the center of rotation of said body, all movable masses being adapted to maintain the resultant center of the masses at a substantial, yet variable distance from said center of rotation, and spring means associated with said mounting means adapted to automatically adjust the reduction of said distance, brought about by the centrifugal effect, in proportion to the increase in the number of revolutions of said body, and further comprising a casing supporting the generator enclosing a step down gearing, a driving motor and a foundation plate supporting both said casing and said motor.

4. A vibration generator for testing technical structures, comprising in combination, a rotary body, means for rotating said body at varying speeds, two lever arms pivoted eccentrically to said body by their inner ends at points near and equidistant from the center of rotation of said body, and centrifugal masses secured near the outer ends of said arms and spaced farther away from said center of rotation than the inner ends thereof, all movable masses being adapted to maintain the resultant center of the masses at a substantial, yet variable distance from said center of rotation, elastic means connecting said arms and counteracting the centrifugal effect acting on said masses so as to automatically adjust the reduction of said distance, brought about by the centrifugal effect, in proportion to the increase in the number of revolutions of said body, and means for kinetically coupling said lever arms so as to cause said arms to assume, at all angular velocities, equal angular positions relative to their line of symmetry.

BORIS V. SCHLIPPE.